(12) United States Patent
Stokes (10) Patent No.: US 7,817,851 B2
(45) Date of Patent: Oct. 19, 2010

(54) COLOR FIDELITY METRIC

(75) Inventor: Michael D. Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 996 days.

(21) Appl. No.: 11/563,611

(22) Filed: Nov. 27, 2006

(65) Prior Publication Data

US 2008/0123941 A1 May 29, 2008

(51) Int. Cl.
- *G06K 9/00* (2006.01)
- *G06K 9/40* (2006.01)
- *H04N 5/00* (2006.01)
- *G03F 3/08* (2006.01)

(52) U.S. Cl. .............. 382/167; 382/112; 382/165; 382/254; 358/518; 348/612

(58) Field of Classification Search .............. 382/167
See application file for complete search history.

(56) References Cited

U.S. PATENT DOCUMENTS

| | | | |
|---|---|---|---|
| 5,923,446 A | 7/1999 | Nakagiri | |
| 6,014,457 A * | 1/2000 | Kubo et al. | 382/167 |
| 6,101,272 A | 8/2000 | Noguchi | |
| 6,157,735 A * | 12/2000 | Holub | 382/167 |
| 6,198,512 B1 | 3/2001 | Harris | |
| 6,542,633 B1 | 4/2003 | Kori | |
| 6,690,485 B1 * | 2/2004 | Borrell et al. | 358/1.9 |
| 6,816,613 B2 | 11/2004 | Tohyama et al. | |
| 7,019,758 B2 | 3/2006 | Hendry et al. | |
| 7,043,385 B2 | 5/2006 | Stokes | |
| 7,358,976 B2 * | 4/2008 | Hampshire et al. | 345/589 |
| 2005/0254704 A1 | 11/2005 | Komiya et al. | |
| 2006/0055835 A1 | 3/2006 | Nitta et al. | |
| 2006/0072131 A1 | 4/2006 | Haikin et al. | |
| 2006/0077487 A1 | 4/2006 | Bevans et al. | |

OTHER PUBLICATIONS

Farnand, et al., "Recent Progress in the Development of ISO 19751", available at least as early as <<Sep. 25, 2006>>, at <<http://www.incits.org/tc_home/w11htm/2006docs/w1106002.pdf#search=%22color%20fidelity%20human%20perception%22>>, pp. 12.

Hersch, et al., "Recent Progress in Digital Halftoning for Color Reproduction State of the Art Report", available at least as early as <<Sep. 25, 2006>>, at <<http://www.iro.umontreal.ca/~ostrom/publications/pdf/GRAPHICON97_RecentProgress.pdf#search=%22color%20processing%20reproduction%20high%20fidelity%20display%20device%22>>, Ecole Polytechnique Federale, pp. 1-8.

Luong, et al., "Isoluminant Color Picking for Non-Photorealistic Rendering", available at least as early as <<Sep. 25, 2006, >>, at <<http://www.cs.princeton.edu/gfx/pubs/Luong_2005_ICP/isolum.pdf#search=%22color%20fidelity%20human%20perception%22>>, pp. 08.

Vrhel, et al., "Color Device Calibration: A Mathematical Formulation", retrieved at <<http://ieeexplore.ieee.org/iel5/83/17485/00806624.pdf?tp=&arnumber=806624&isnumber=1748>>, IEEE Transactions on Image Processing, vol. 8, No. 12, Dec. 1999, IEEE, 1999, pp. 1796-1806.

\* cited by examiner

*Primary Examiner*—Anand Bhatnagar
*Assistant Examiner*—Jose M Torres
(74) *Attorney, Agent, or Firm*—Lee & Hayes, PLLC (57) ABSTRACT

Various embodiments employ methods and techniques to determine if color reproduction by a device produces or may potentially produce objectionable or unacceptable color-related phenomena. The methods and techniques, in at least some embodiments, can analyze trends in color reproduction to detect artifacts that may indicate objectionable or unacceptable color-related phenomena.

17 Claims, 9 Drawing Sheets

COLOR FIDELITY METRIC

BACKGROUND

Color fidelity is an important consideration in the development of products and devices that utilize color. Examples of such products include publishing products, photo editors, computer-generated imaging products, and the like. For example, a vendor may develop a product for a particular type or class of device based on a specific color production method or protocol. However, for one reason or another, the target device may fail to reproduce one or more colors as intended by the vendor. In some instances, an inaccuracy or lack of fidelity in color reproduction may be so negligible as to go unnoticed by a user of the device. In other situations, however, inaccuracies in color reproduction may be significant enough to produce objectionable color-related phenomena. Thus, it can be desirable to have the ability to determine if color reproduction by a device is within the limits of acceptability or whether the device is reproducing color such that objectionable color-related phenomena are or may potentially be present.

One method of determining the acceptability of a device's color reproduction is to query end users of the device for their opinion concerning visual acceptability. This method, however, is expensive and time consuming and thus not favorable in most product development scenarios. Another method is to utilize processing techniques, such as the delta E method, to measure the difference (i.e. the Euclidean distance in a perceptually uniform color space) between an original color as specified by a product and the actual color reproduced when the product is implemented by a device. These processing techniques tend, however, to have granularities that detect only major errors in color reproduction.

SUMMARY

Various embodiments employ methods and techniques to determine if color reproduction by a device produces or may potentially produce objectionable or unacceptable color-related phenomena. The methods and techniques, in at least some embodiments, can utilize a trend-based analysis to analyze trends in color reproduction to detect artifacts that may indicate objectionable or unacceptable color-related phenomena.

DETAILED DESCRIPTION

Overview

Various embodiments employ methods and techniques to determine if color reproduction by a device produces or may potentially produce objectionable or unacceptable color-related phenomena. The methods and techniques, in at least some embodiments, can analyze trends in color reproduction to detect artifacts that may indicate objectionable or unacceptable color-related phenomena.

In the embodiments described below, methods and techniques are utilized to analyze color components, such as lightness, chroma, hue and the like, and detect if present, objectionable and/or visually noticeable color-related phenomena in scenarios where color is reproduced. These color components are mentioned for purposes of example only, and other color components may be analyzed without departing from the spirit and scope of the claimed subject matter. In practice, at least some of the embodiments described below utilize a trend-based approach to detect objectionable or noticeable phenomena by first identifying trends associated with color reproduction, and then identifying color component values that fail to conform or are otherwise undesirable relative to these trends.

In color reproduction scenarios, a particular device such as a display device, printer and the like, includes certain constituent parts that process image data for reproducing the image data. These constituent parts can include software, firmware and hardware components that can form or otherwise provide a processing pipeline. It is desirable for color components associated wit an image (e.g. lightness, chroma and hue) and specified by these constituent parts to be reproduced by an associated device with a certain level of fidelity. If the display device's output values with respect to one or more color components vary significantly from the input values provided to or by the device's constituent parts, aspects of an image may become objectionable to a viewer. Thus, in some embodiments, methods and techniques are described for comparing input color components with output color components to detect objectionable color-related phenomena in one or more images.

As used herein, input color components refer to the color components provided to a device. Output color components refer to the color components produced by a device in response to the input color components. Further, objectionable color-related phenomena, in some embodiments, are color-related phenomena that diverge from an expected value or fall outside an expected and/or desired range of values as defined by a particular observable trend. Thus, the expected values or range of values for specific color components need not be predefined, but can be tailored to fit particular color reproduction scenarios.

Figure 1:
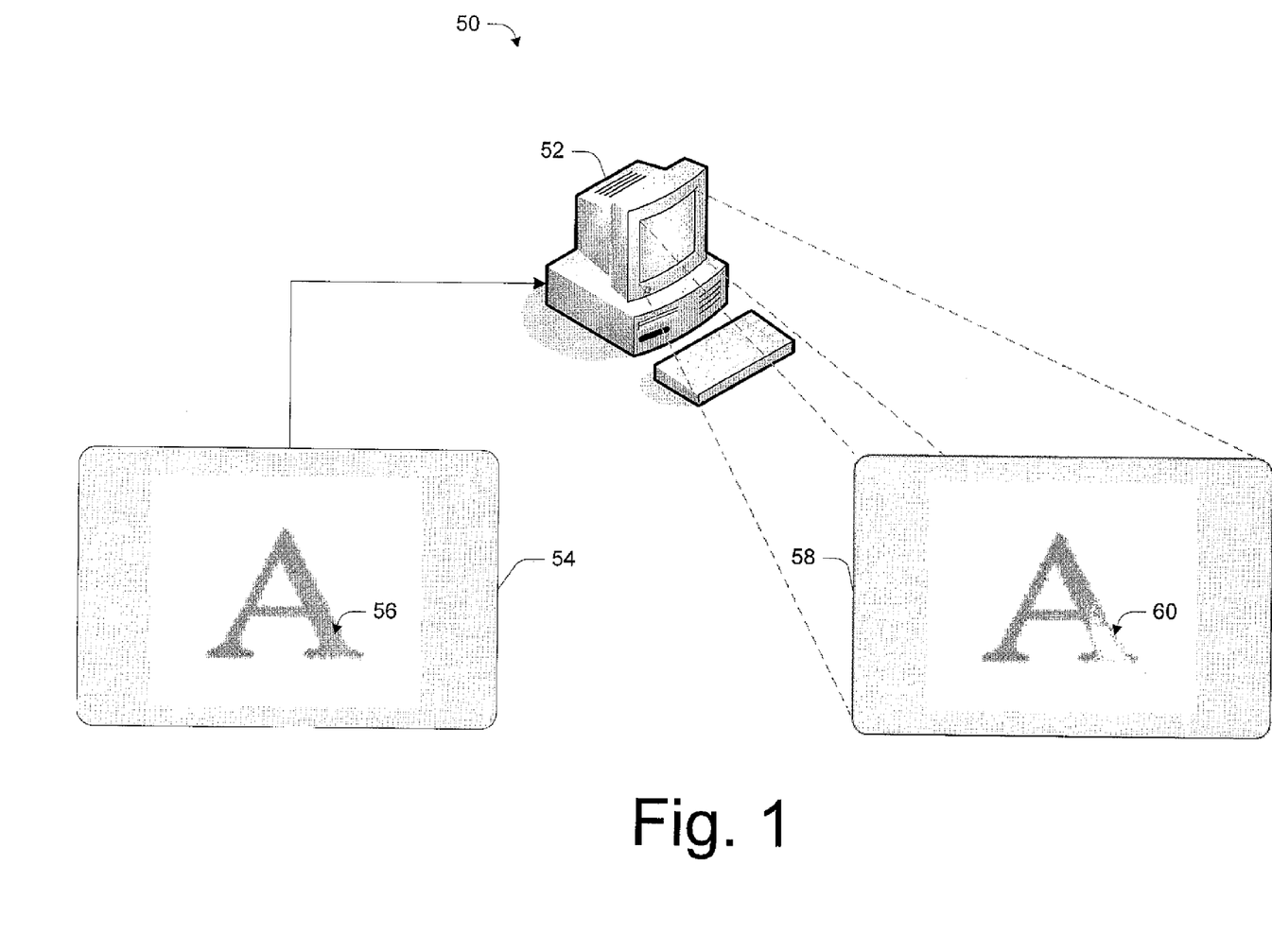
FIG. 1 illustrates an exemplary system that can implement a color reproduction scenario in accordance with one embodiment.

FIG. 1 illustrates, generally at 50, one example of a system that can implement a color reproduction scenario in accordance with one embodiment. System 50 includes device 52 that can implement color reproduction methods or protocols. A desktop computer is used in system 50 for purposes of example only, and other suitable devices may be employed such as laptop computers, personal digital assistants, cell phones and the like.

In some embodiments, a device (such as a desktop computer) can include one or more processors, one or more computer-readable media, and computer-readable instructions embodied on the computer-readable media. Further to some embodiments, the computer-readable instructions embodied on the computer-readable media can implement the methods and techniques described herein. Examples of suitable computer-readable media include hard disks, removable magnetic disks, removable optical disks, magnetic cassettes, flash memory cards, digital video disks, random access memories (RAMs), read only memories (ROMs), and the like.

As part of system 50, an image 54 is provided to device 52. Image 54 includes input color components (i.e. the components of the colors that make up the image). The image input color components are then processed by device 52 and the input color components are reproduced as output color components. The image is then displayed as image 58. In this example, there may be some divergence between the input color components and the output color components. For example, image 54 shows a trend of gradually increasing lightness around region 56. However, when image 54 is reproduced and displayed as image 58, this trend has been greatly exaggerated, as shown in region 60. Thus, a user or viewer may likely consider image 58 to be an objectionable or unacceptable reproduction of image 54. System 50 is presented for purposes of example only, and is not intended to limit the claimed subject matter.

Exemplary Lightness Analysis

Figure 1A:
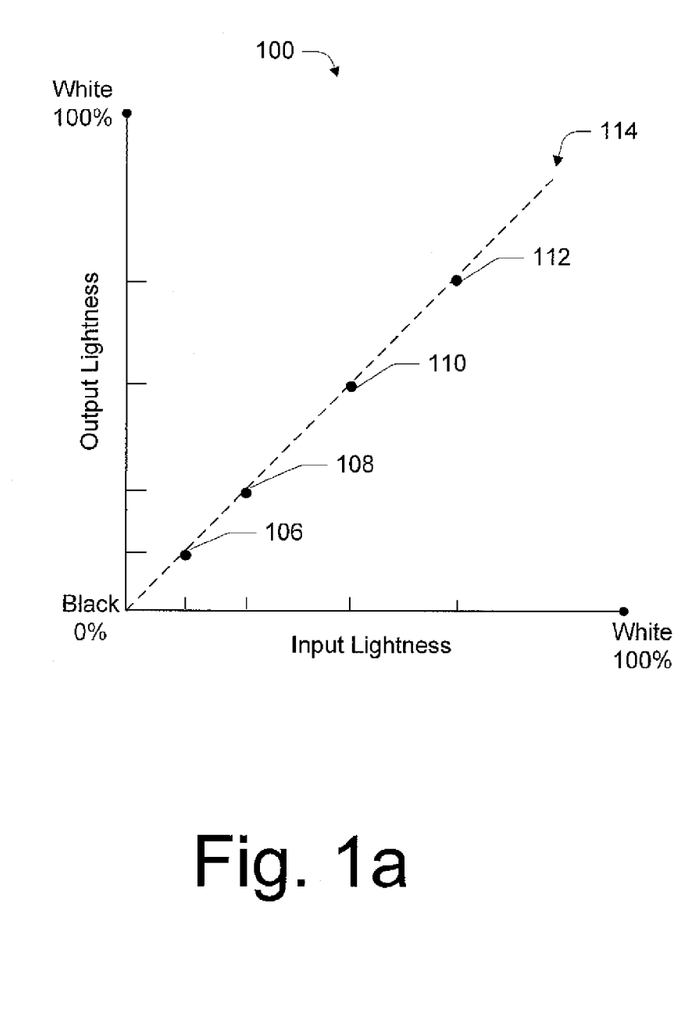
FIG. 1a illustrates an exemplary lightness reproduction graph in accordance with one embodiment.

FIG. 1a illustrates, generally at 100, a graph in accordance with one embodiment. In this embodiment, input lightness values provided by or to a device's constituent parts are compared with their corresponding device output lightness values to determine the fidelity with which the device reproduces lightness values. Generally stated, lightness refers to how dark or light a color is, with 100% lightness referring to white and 0% lightness referring to black, as will be appreciated by the skilled artisan. Further to this embodiment, input lightness values are graphed along the x-axis. The zero point of x-axis represents 0% lightness and the opposite end represents 100% lightness. The output lightness values are graphed along y-axis. The zero point of y-axis represents 0% lightness and the opposite end represents 100% lightness. Data points 106, 108, 110 and 112 represent a comparison of input lightness values with output lightness values. Thus, data point 106 is graph of the data point (input lightness value, output lightness value). This applies to the remaining data points 108, 110 and 112, with each representing a different set of input and output lightness values.

In this embodiment and as can be seen from this graph, the input lightness values are approximately equal to the output lightness values. Thus, an approximately straight line 114 can be drawn through the data points. Accordingly, since the output lightness values are approximately equal to the input lightness values over the range of lightness values examined, it can be concluded, at least in this example, that the output device is reproducing the input lightness values in this range with a fairly high degree of fidelity. As such, the output device should not produce any objectionable lightness-related phenomena.

Figure 2:
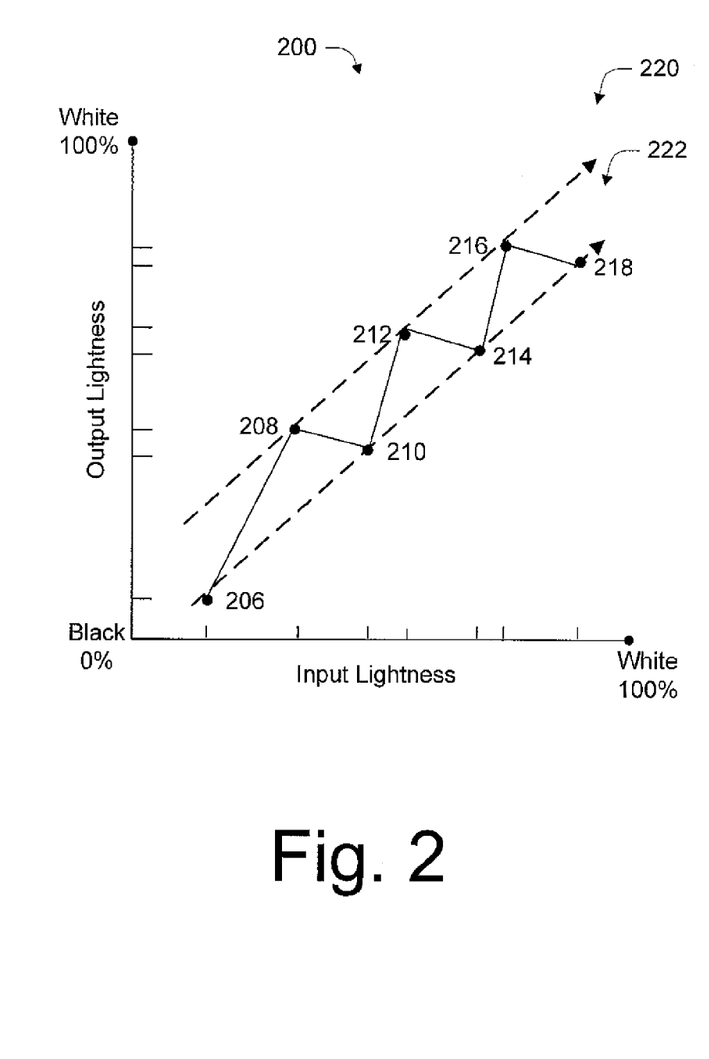
FIG. 2 illustrates an exemplary lightness reproduction graph in accordance with one embodiment.

In another exemplary lightness analysis, FIG. 2 illustrates, generally at 200, a graph in accordance with one embodiment. In this embodiment, input lightness values provided to a device are compared with their corresponding device output lightness values to determine the fidelity with which the device reproduces lightness values. Data points 206, 208, 210, 212, 214, 216 and 218 represent a comparison of input lightness values with output lightness values. Thus, data point 206 is graph of the data point (input lightness value, output lightness value), as are the remaining data points.

In this particular example, the output lightness values are not all equal to their corresponding input lightness values. For example, the input lightness value for data point 210 is greater than that of data point 208. However, the output lightness value of data point 210 is less than that of data point 208. Thus, there is some divergence between some of the input lightness values and the corresponding output lightness values.

However, even though there is some divergence between some of the input and output lightness values, an approximately uniform trend of increasing lightness can be detected, as indicated by trendlines 220 and 222. This ability to detect a trend in the lightness values establishes one method or technique by which objectionable lightness-related phenomena may be detected. Thus, in this embodiment, as long as the data points corresponding to the input lightness values and the output lightness values substantially conform to the established trend(s), the output device should not produce any objectionable lightness-related phenomena.

Figure 3:
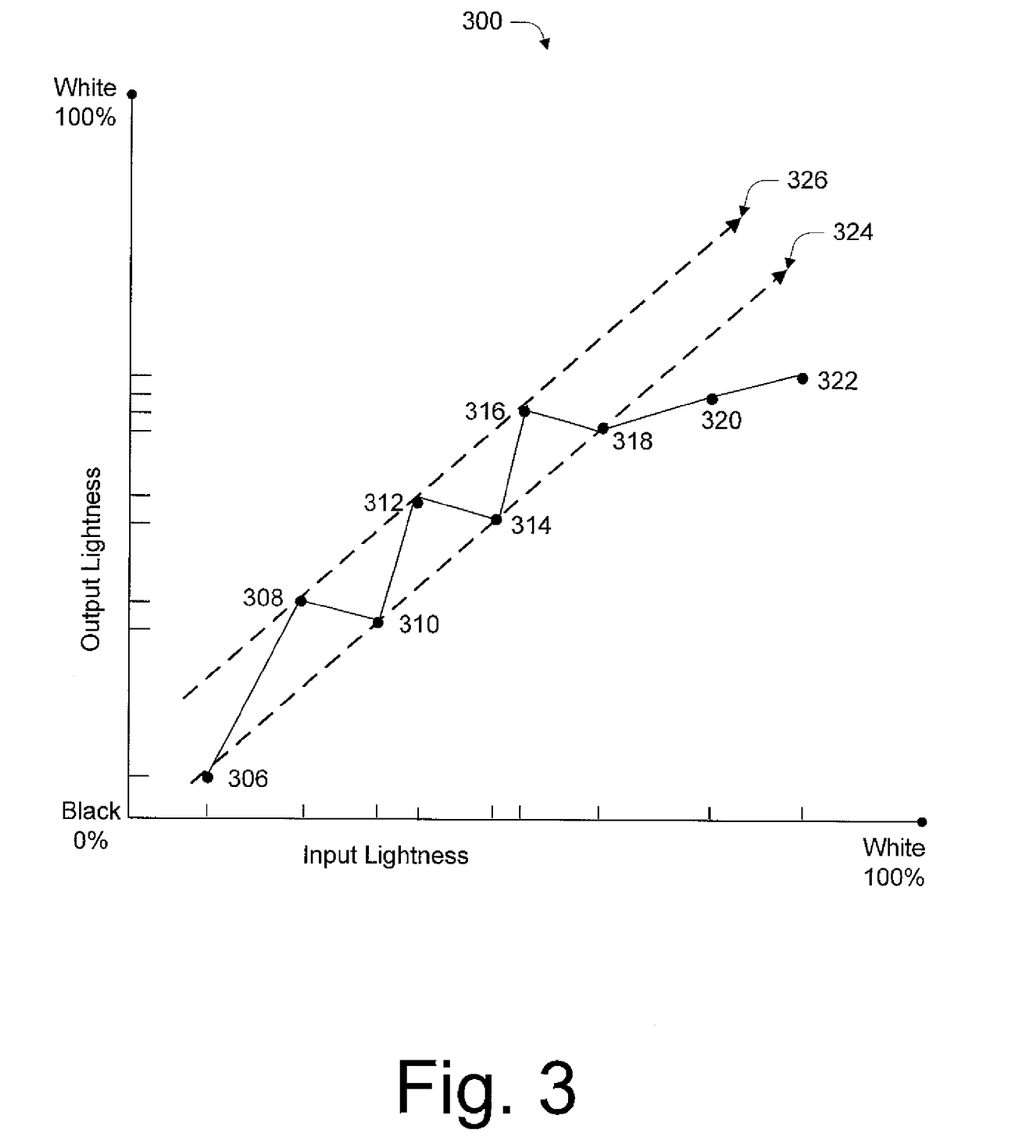
FIG. 3 illustrates an exemplary lightness reproduction graph in accordance with one embodiment.

In another exemplary lightness analysis, FIG. 3 illustrates, generally at 300, a graph in accordance with one embodiment. In this embodiment, input lightness values provided to a device are compared with their corresponding device output lightness values to determine the fidelity with which the device reproduces lightness values. Data points 306, 308, 310, 312, 314, 316, 318, 320 and 322 represent a comparison of input lightness values with output lightness values. Thus, data point 306 is a graph of the data point (input lightness value, output lightness value), as are the remaining data points.

Similar to FIG. 2 above, even though the input and output lightness values in this analysis do not correspond one-to-one, a trend of increasing lightness can be detected with respect to data points 306 through 318. This trend is indicated by trendlines 324 and 326. However, notice that data points 320 and 322 "break through" trendline 324. Thus, the trend in increasing lightness that is established by the previous data points is not followed by data points 320 and 322. This may indicate a trend reversal such that the output lightness values are diverging from the input lightness values to such a degree that the device may display objectionable lightness-related phenomena.

In some embodiments, an indication of a deviation from a trend, or a "trend reversal", can trigger an indication that a particular device may not be reproducing one or more color components (in the previous examples, lightness) within acceptable limits. Based on this indication, the device and/or its associated componentry can be modified or corrected to allow for acceptable color reproduction.

Further examples of trends and statistical patterns, from a general standpoint, can be found in the book *Technical Analysis of the Financial Markets* by John J. Murphy, published by the New York Institute of Finance, copyright 1999. Some of these very same principles, in terms of trend analysis and statistical processing, can be employed for analyzing color components.

Figure 4:
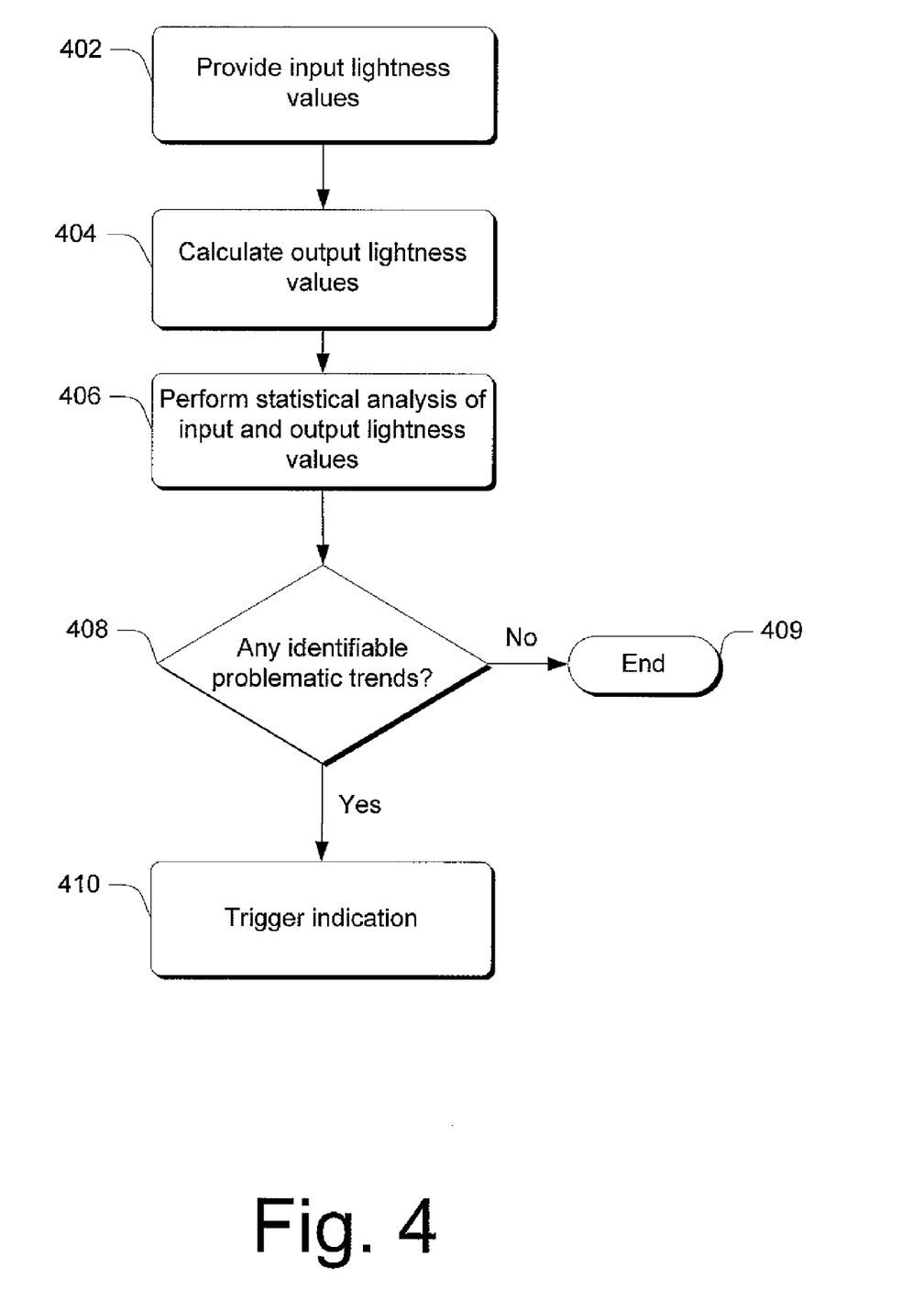
FIG. 4 is a flow diagram that describes acts in a method in accordance with one embodiment.

FIG. 4 is a flow diagram that describes color fidelity metric processing in accordance with one embodiment. The method can be implemented in connection with any suitable hardware, software, firmware or combination thereof while this embodiment analyzes lightness values, other embodiments may analyze other components of color such as hue, chroma, tone and the like.

Act 402 provides a set of input lightness values to a device. Act 402 can be performed, for example, by providing one or more images that include the input lightness values. Act 404 calculates the device output lightness values that correspond to one or more of the provided input lightness values. As one example, act 404 can include converting or transforming the input lightness values associated with one or more images so that the image(s) can be output and/or displayed by a device. Act 406 performs a statistical analysis of the input and output lightness values. Examples of suitable methods of statistical analysis are discussed above. However, this is not intended to be limiting, and other suitable methods of statistical analysis may be employed. In at least some embodiments, the statistical analysis can include analyzing the input versus the output values and identifying relationships that the input values have with the output values.

Act 408 ascertains, in view of the statistical analysis, whether the lightness values exhibit one or more identifiable problematic trends. If there are no identifiable problematic trends, act 409 terminates the processing. If, on the other hand, there are one or more problematic trends that are identified (such as data points that fail, in some manner, to conform to an expected value or value range), act 410 can trigger an indication that the device is displaying or may potentially display objectionable lightness-related phenomena. Based on this indication, the device and/or its associated componentry can be modified or corrected to allow for acceptable color reproduction.

Exemplary Chroma Analysis

The methods and techniques described above for lightness analysis, i.e. trend based analysis, can also be employed for chroma analysis. Generally stated, chroma refers to the intensity or saturation of a color, as will be appreciated by the skilled artisan.

Figure 5:
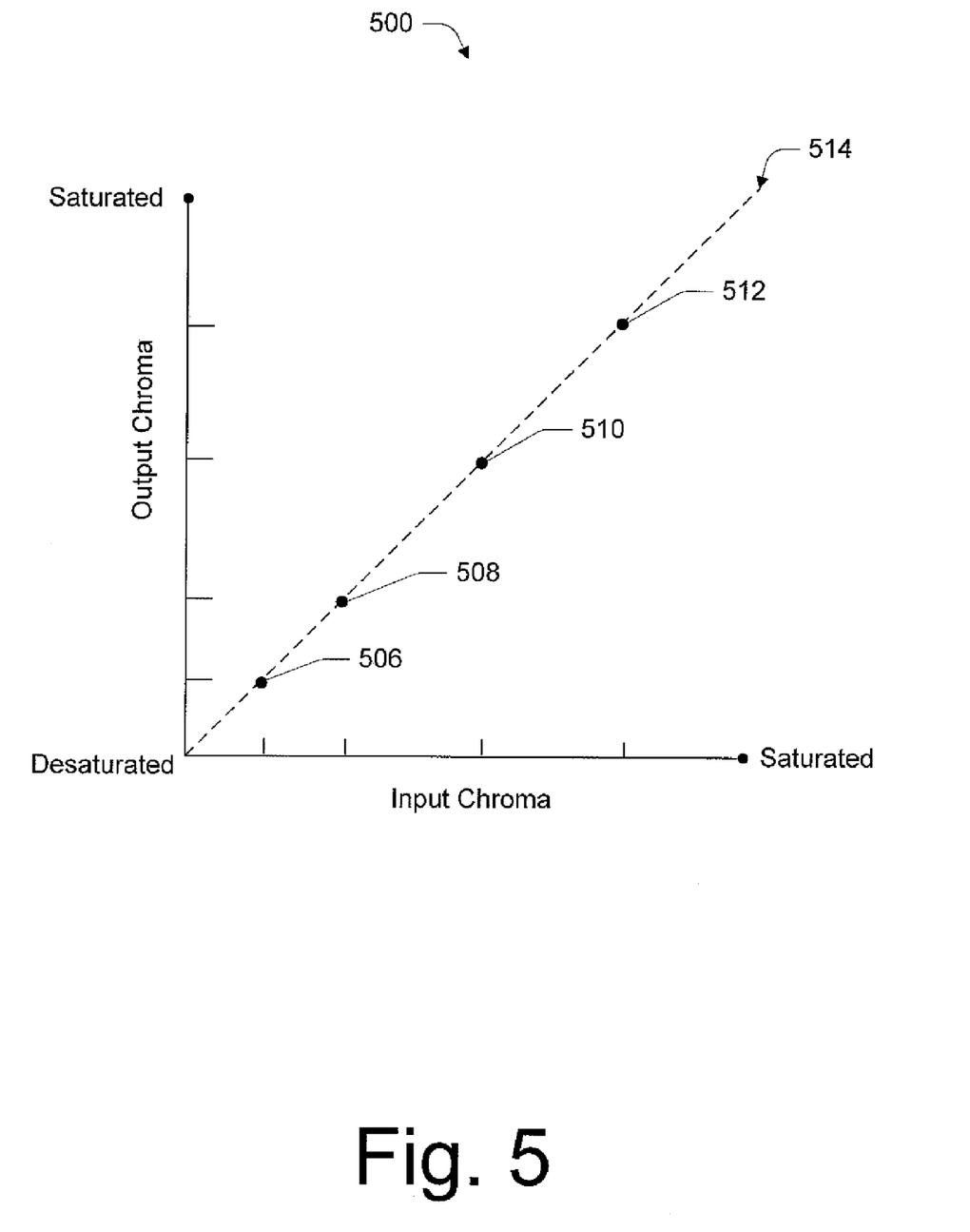
FIG. 5 illustrates an exemplary chroma reproduction graph in accordance with one embodiment.

FIG. 5 illustrates generally at 500 a graph that may be utilized to statistically analyze input and output chroma values. The x-axis represents the input chroma values as provided to a device, with the zero point of the axis representing a fully desaturated color and the opposite end of the axis representing a fully saturated color. The y-axis represents the device output chroma values, with the zero point of the axis representing a fully desaturated color and the opposite end of the axis representing a fully saturated color.

Data points 506, 508, 510 and 512 represent a comparison of input chroma values with output chroma values. Thus, data point 506 is graph of the data point (input chroma value, output chroma value). This applies to the remaining data points, with each representing a different set of input and output chroma values. Line 514 is drawn through the data points and indicates that the input chroma values and the output chroma values have an approximately one-to-one relationship. Thus, for each input chroma value, the output device is outputting approximately the same chroma value. This indicates a relatively high degree of chroma output fidelity.

The techniques and methods discussed above with respect to lightness analysis may be employed in the analysis of chroma. Specifically, statistical and trend-based analyses may be utilized to determine if a device is producing or may potentially produce objectionable or noticeable chroma-related phenomena.

Figure 5A:
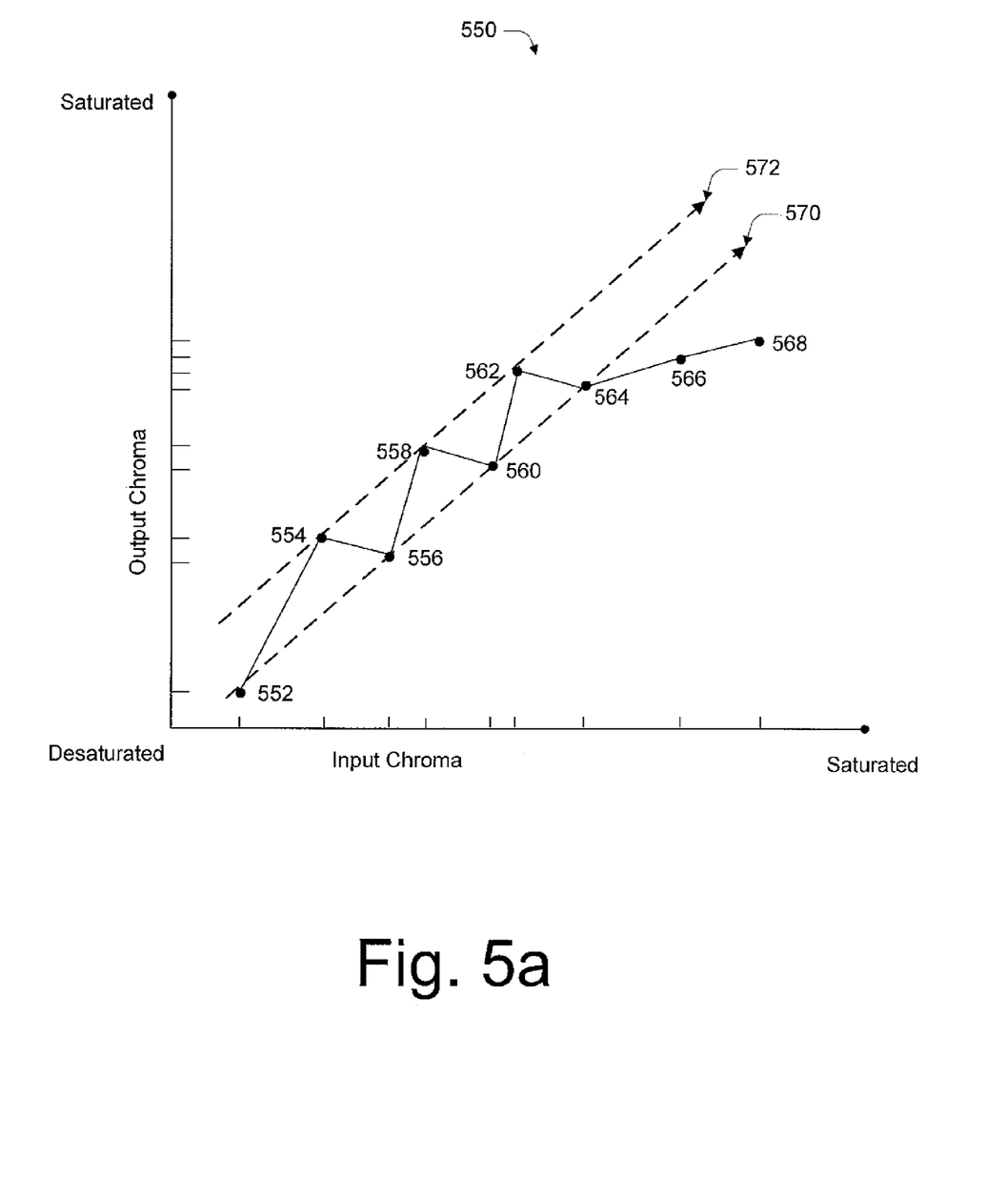
FIG. 5a illustrates an exemplary chroma reproduction graph in accordance with one embodiment.

In another exemplary chroma analysis, FIG. 5a illustrates, generally at 550, a graph in accordance with one embodiment. In this embodiment, input chroma values provided to a device are compared with their corresponding device output chroma values to determine the fidelity with which the device reproduces chroma values. Data points 552, 554, 556, 558, 560, 562, 564, 566 and 568 represent a comparison of input chroma values with output chroma values. Thus, data point 552 is a graph of the data point (input chroma value, output chroma value), as are the remaining data points.

Even though the input and output chroma values in this analysis do not correspond one-to-one, a trend of increasing chroma can be detected with respect to data points 552 through 564. This trend is indicated by trendlines 570 and 572. However, notice that data points 566 and 568 "break through" trendline 570. Thus, the trend in increasing chroma that is established by the previous data points is not followed by data points 566 and 568. This may indicate a trend reversal such that the output chroma values are diverging from the input chroma values to such a degree that the device may display objectionable chroma-related phenomena. The illustration of data points 566 and 568 breaking through trendline 568 is not intended to be limiting, and other embodiments may include alternate trends and alternate deviations from trends. As but one example, one embodiment may indicate a deviation from a trend by data points that break through an upper trend line, such as trend line 572 in this example.

In some embodiments, an indication of a deviation from a trend or a trend reversal can trigger an indication that a particular device may not be reproducing one or more color components (in the previous examples, chroma) within acceptable limits. Based on this indication, the device and/or its associated componentry can be modified or corrected to allow for acceptable color reproduction.

Exemplary Hue Analysis

The methods and techniques described above for lightness analysis may also be employed for hue analysis. Generally stated, hue refers to the dominant wavelength(s) of light in a particular color and can be measured in terms of the position in degrees on a particular color wheel or color model, as will be appreciated by the skilled artisan.

Figure 6:
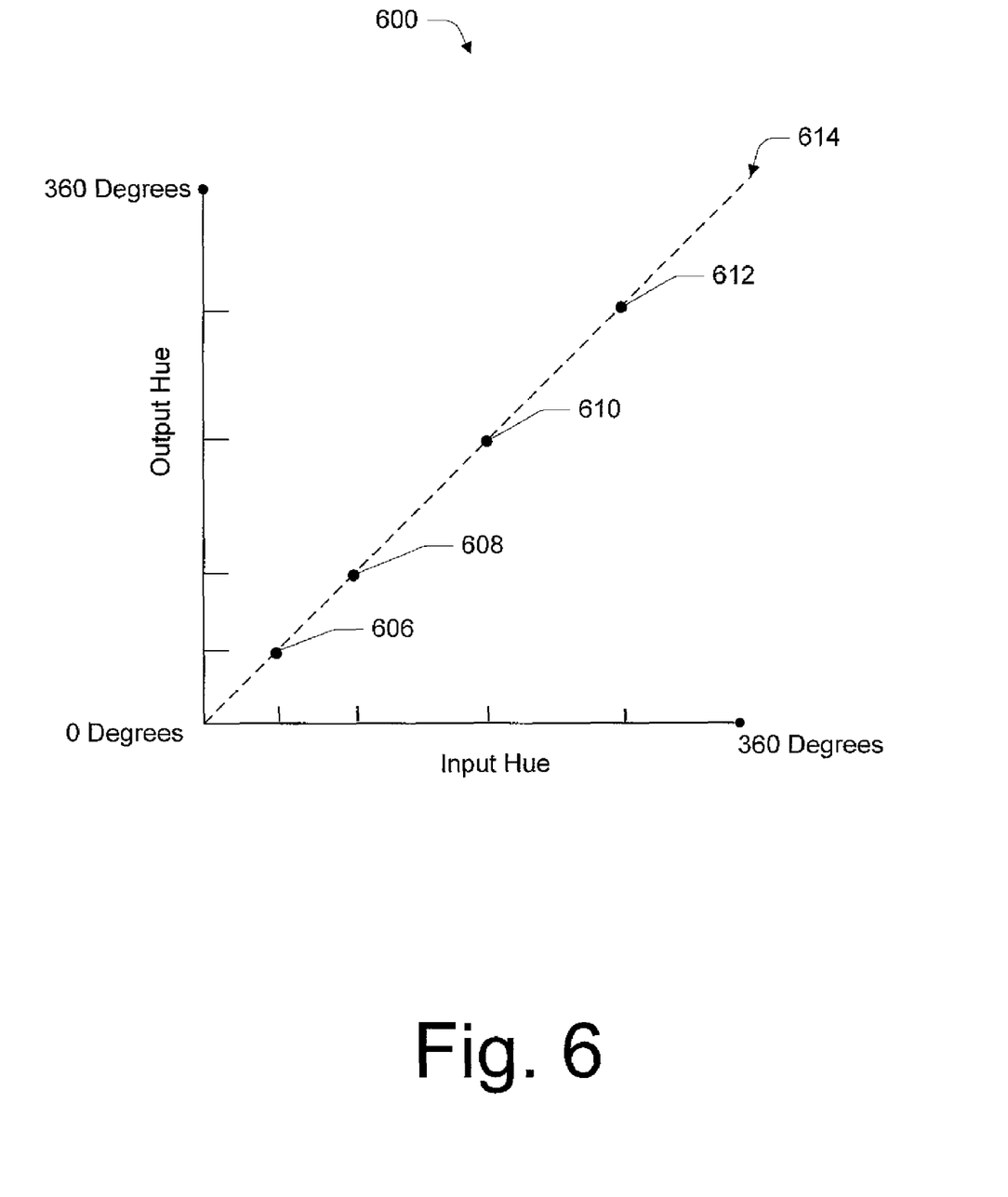
FIG. 6 illustrates an exemplary hue reproduction graph in accordance with one embodiment.

FIG. 6 illustrates generally at 600 a graph that may be utilized to statistically analyze input and output hue values. The x-axis represents the input hue values as provided to a device, with the zero point of the axis representing 0 degrees of hue and the opposite end of the axis representing 360 degrees of hue. The y-axis represents the device output hue values, with the zero point of the axis representing 0 degrees of hue and the opposite end of the axis 360 degrees of hue.

Data points 606, 608, 610 and 612 represent a comparison of input hue values with output hue values. Thus, data point 606 is graph of the data point (input hue value, output hue value). This applies to the remaining data points, with each representing a different set of input and output hue values. Line 614 is drawn through the data points and indicates that the input hue values and the output hue values have an approximately one-to-one relationship. Thus, for each input hue value, the output device is outputting approximately the same hue value. This indicates a relatively high degree of hue output fidelity.

The techniques and methods discussed above with respect to lightness analysis may be employed in the analysis of hue. Thus, the statistical and trend-based analyses may be utilized to determine if a device is producing or may potentially produce objectionable or noticeable hue-related phenomena.

Figure 6A:
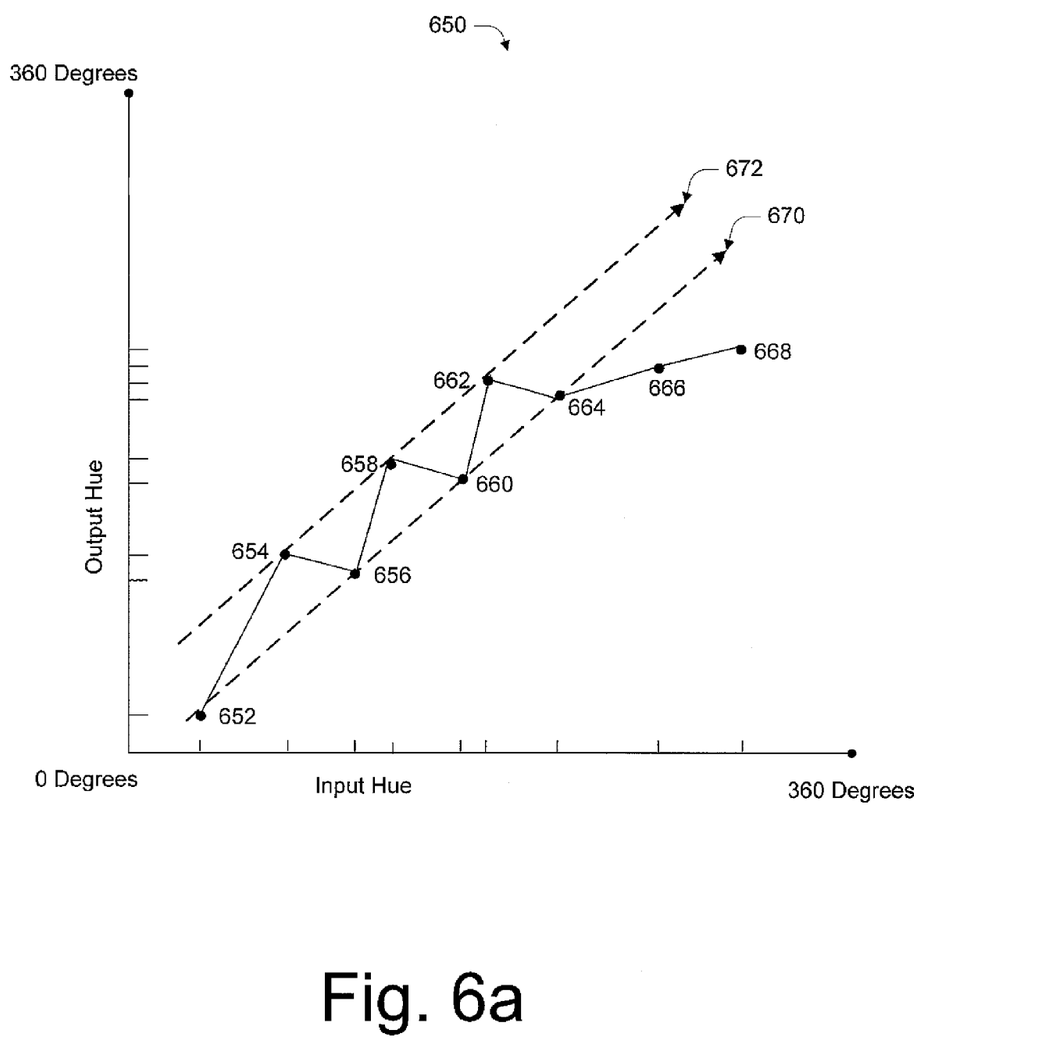
FIG. 6a illustrates an exemplary hue reproduction graph in accordance with one embodiment.

In another exemplary hue analysis, FIG. 6a illustrates, generally at 650, a graph in accordance with one embodiment. In this embodiment, input hue values provided to a device are compared with their corresponding device output hue values to determine the fidelity with which the device reproduces hue values. Data points 652, 654, 656, 658, 660, 662, 664, 666 and 668 represent a comparison of input hue values with output hue values. Thus, data point 652 is a graph of the data point (input hue value, output hue value), as are the remaining data points.

Even though the input and output hue values in this analysis do not correspond one-to-one, a trend of increasing hue can be detected with respect to data points 652 through 664. This trend is indicated by trendlines 670 and 672. However, notice that data points 666 and 668 "break through" trendline

670. Thus, the trend in increasing hue that is established by the previous data points is not followed by data points 666 and 668. This may indicate a trend reversal such that the output hue values are diverging from the input hue values to such a degree that the device may display objectionable hue-related phenomena. The illustration of data points 666 and 668 breaking through trendline 668 is not intended to be limiting, and other embodiments may include alternate trends and alternate deviations from trends. As but one example, one embodiment may indicate a deviation from a trend by data points that break through an upper trend line, such as trend line 672 in this example.

In some embodiments, an indication of a deviation from a trend or a trend reversal can trigger an indication that a particular device may not be reproducing one or more color components (in the previous examples, hue) within acceptable limits. Based on this indication, the device and/or its associated componentry can be modified or corrected to allow for acceptable color reproduction.

Other Color Systems and Color Spaces

In addition to the color component description protocols utilized in the examples above, other systems and methods for representing color components may be utilized without departing from the spirit and scope of the claimed embodiments. For example, a rectilinear coordinate-based system may be utilized to represent the specific components of a particular color. One example of such a system is the CIELAB uniform color space, which uses the L*, a* and b* dimensions to represent color in a three-dimensional color space. L* refers to the lightness of a particular color, a* refers to the "redness/greenness" (or in some cases the "magentaness/greenness") of a particular color, and b* refers to the "yellowness/blueness" of a particular color, as will be appreciated by an artisan of ordinary skill in the art. Thus, using the statistical and trend-based methods discussed above, these color components may be analyzed to determine the fidelity with which a device is reproducing color components.

The discussion of these examples is not intended to be limiting, and the systems and methods discussed herein may be employed to analyze color components according to other suitable color spaces and color appearance models. Other suitable color characterization methods include, but are not limited to, the CIELUV color space, the CIEXYZ color space, the RGB tristimulus model and the like.

Psychophysical Analysis

In some embodiments, psychophysical testing and analysis can be utilized in combination with the above-described methods and techniques. Generally stated, psychophysical testing refers to methods and techniques for analyzing the relationships between physical stimuli and sensory response. Thus, in the context of color reproduction scenarios, psychophysical testing can include analyzing human sensory response to color related visual stimuli.

As but one example, one or more individuals are shown images with varying degrees of divergence in color component values. The individuals are then queried concerning their opinion of the respective images. Thus, some images might be considered by a majority of the individuals to be visually acceptable, while others may be considered visually unacceptable based on the presence of visually objectionable phenomena. Using these queries, the degrees of divergence in color component values are then correlated with the corresponding levels of visual acceptability or unacceptability. Thus, an approximate degree of visually acceptable color component divergence is quantified in terms of color component values. The resulting quantification is then used to analyze devices and their constituent parts to determine if they are reproducing color within visually acceptable limits.

In some embodiments, psychophysical testing and analysis techniques can be combined with the above-described statistical and trend-based methods to determine if a device is reproducing color within visually acceptable limits.

Figure 7:
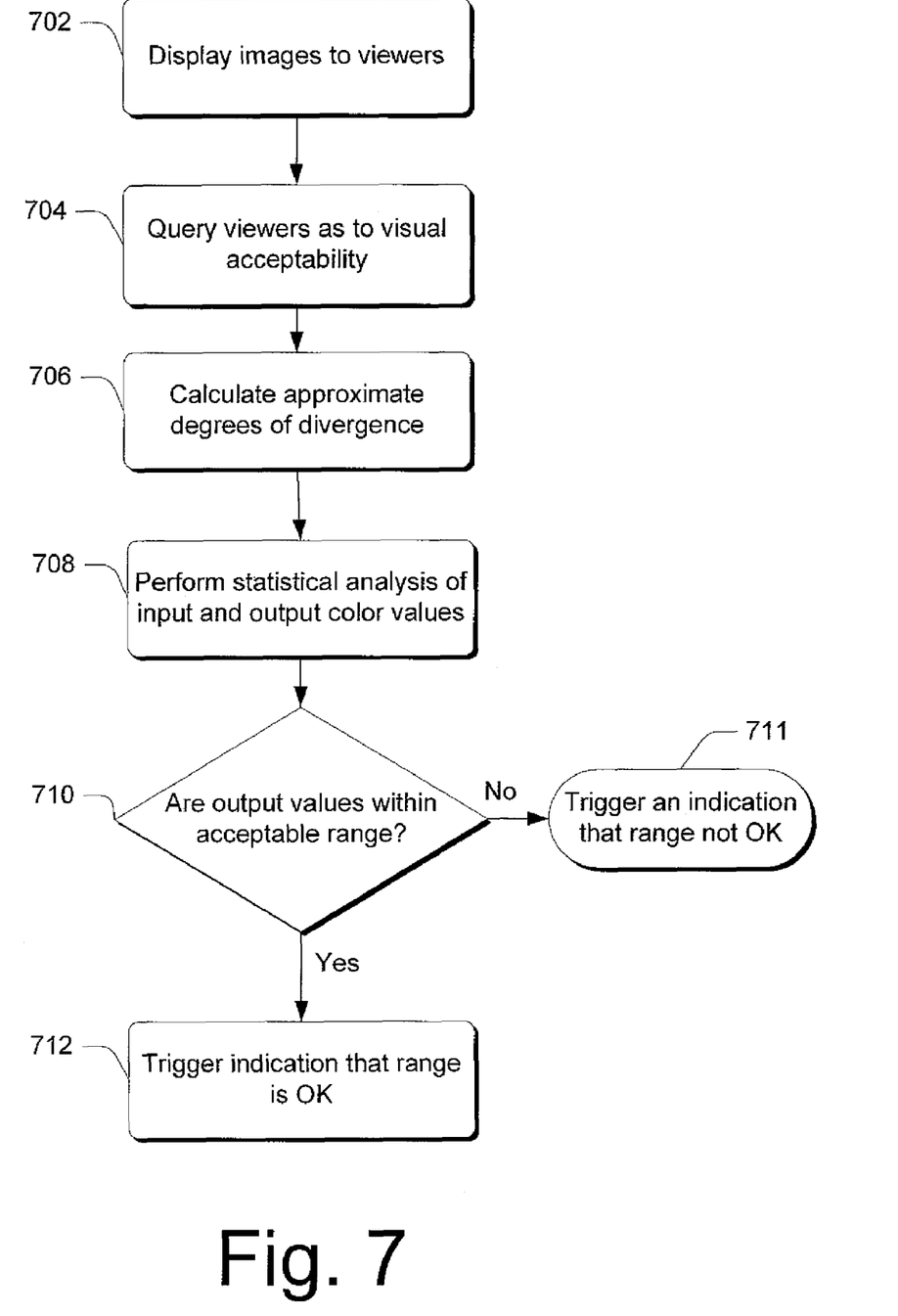
FIG. 7 is a flow diagram that describes acts in a method in accordance with one embodiment.

FIG. 7 is a flow diagram that describes color fidelity metric processing that incorporates psychophysical testing, in accordance with one embodiment. The method can be implemented in connection with any suitable hardware, software, firmware or combination thereof.

Act 702 displays one or more images to a set of viewers. In some embodiments, the images contain one or more divergences in color component values. Exemplary color component values are discussed above Act 704 queries the viewers as to the visual acceptability or unacceptability of the images. The acceptability or not of a particular image may relate to the image as a whole or simply a particular portion of the image. In some embodiments, the determination of visual acceptability may be based on a simple majority of the queried viewers. However, other modes of statistical analysis of viewer reaction to visual images may be employed without departing from the spirit and scope of the claimed embodiments. Based at least in part on the viewer queries, act 706 calculates the approximate leveles) of divergence in color component values that are visually acceptable, and those that are not.

Act 708 performs a statistical and/or trend-based analysis of the input and output color component values for a particular device or devices. The methods and techniques discussed above may be utilized, along with any other suitable methods or techniques. Act 710 determines if any divergence in the output color component values from the input color component values fall within the previously-determined range(s) of visual acceptability. If there are divergences that do not fall within the ranges of visually acceptability, act 711 triggers an indication that visually unacceptable phenomena are being or potentially may be displayed. If no divergences are detected that fall outside the range of visual acceptability, act 712 triggers an indication as such.

CONCLUSION

Various embodiments employ methods and techniques to determine if color reproduction by a device produces or may potentially produce objectionable or unacceptable color-related phenomena. The methods and techniques, in at least some embodiments, can analyze trends in color reproduction to detect artifacts that may indicate objectionable or unacceptable color-related phenomena.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving input color component values;
producing, from the input color component values, output color component values;
detecting one or more trends associated with the input color component values; and
analyzing the input and output color component values, using trend-based analysis, to detect an undesirable divergence from the one or more trends by a subset of the output color component values.

2. The method of claim 1, wherein the analyzing analyzes component values comprising lightness values.

3. The method of claim 1, wherein the analyzing analyzes component values comprising chroma or hue values.

4. The method of claim 1, wherein the analyzing analyzes color component values in a rectilinear color coordinate system.

5. The method of claim 1, wherein the analyzing analyzes component values comprising lightness, chroma and hue values.

6. The method of claim 1 further comprising:
when the subset of the output color component values diverge from the one or more trends, triggering an indication of such divergence.

7. One or more non-transitory computer-readable media embodying computer-readable instructions which, when executed by one or more processors, cause the one or more processors to implement a method comprising:
statistically analyzing one or more color components in a color reproduction scenario, the statistically analyzing comprising:
creating two or more data points, the two or more data points comprising associated input color component values and output color component values;
creating one or more other data points, the one or more other data points comprising associated input color component values and output color component values;
determining when the two or more data points indicate one or more trends; and
when the two or more data points indicate one or more trends,
determining when the one or more other data points diverge from the one or more trends; and
based on the statistically analyzing, determining when there are one or more objectionable phenomena in the color reproduction.

8. The one or more non-transitory computer-readable media of claim 7, wherein the one or more color components include lightness.

9. The one or more non-transitory computer-readable media of claim 7, wherein the one or more color components include chroma or hue.

10. The one or more non-transitory computer-readable media of claim 7, wherein the one or more color components include color components in a rectilinear color coordinate system.

11. The one or more non-transitory computer-readable media of claim 7, wherein the one or more color components include lightness, chroma and hue.

12. The one or more non-transitory computer-readable media of claim 7, wherein the statistically analyzing further comprises:
when the one or more other data points diverge from the one or more trends, triggering an indication of the divergence.

13. A method comprising:
providing a visual image to a device, wherein the visual image comprises input color component values;
processing the image to produce output color component values, wherein each output color component value is associated with an input color component value;
statistically analyzing the input color component values and the output color component values;
determining when statistical analysis indicates one or more trends in the production of the output color component values;
when one or more trends are detected, determining when one or more output color component values diverge from at least one of the one or more trends; and
detecting objectionable phenomena in the production of the output color component values based on divergence of the one or more output color component values.

14. The method of claim 13 wherein the input color component values include lightness values.

15. The method of claim 13, wherein the input color component values include chroma or hue values.

16. The method of claim 13, wherein the input color component values include color coordinates in a rectilinear color coordinate system.

17. The method of claim 13, wherein when it is determined that one or more output color component values diverge from the at least one of the one or more trends, triggering an indication that the device is displaying or may potentially display objectionable or noticeable phenomena.

\* \* \* \* \*